(12) United States Patent
Noréus (10) Patent No.: US 11,196,093 B2
(45) Date of Patent: Dec. 7, 2021

(54) METAL HYDRIDE BATTERY WITH ADDED HYDROGEN GAS, OXYGEN GAS OR HYDROGEN PEROXIDE

(71) Applicant: Nilar International AB, Täby (SE)

(72) Inventor: Dag Noréus, Saltsjö-Duvnäs (SE)

(73) Assignee: Nilar International AB, Täby (SE)

(*) Notice: Subject to any disclaimer, the term of this patent is extended or adjusted under 35 U.S.C. 154(b) by 92 days.

(21) Appl. No.: 16/822,569

(22) Filed: Mar. 18, 2020

(65) Prior Publication Data

US 2020/0220226 A1  Jul. 9, 2020

Related U.S. Application Data

(63) Continuation of application No. 15/769,015, filed as application No. PCT/SE2016/051020 on Oct. 19, 2016, now Pat. No. 10,637,104.

(30) Foreign Application Priority Data

Oct. 21, 2015 (SE) .................................... 1551360-9

(51) Int. Cl.
*H01M 4/00* (2006.01)
*H01M 10/42* (2006.01)
*H01M 4/24* (2006.01)
*H01M 4/32* (2006.01)
*H01M 10/30* (2006.01)
(Continued)

(52) U.S. Cl.
CPC ....... *H01M 10/4242* (2013.01); *H01M 4/242* (2013.01); *H01M 4/244* (2013.01); *H01M 4/246* (2013.01); *H01M 4/32* (2013.01); *H01M 10/24* (2013.01); *H01M 10/30* (2013.01); *H01M 10/34* (2013.01); *H01M 50/30* (2021.01); *H01M 50/411* (2021.01); *H01M 50/60* (2021.01); *H01M 2300/0014* (2013.01)

(58) Field of Classification Search
CPC ...... H01M 50/60; H01M 10/30; H01M 4/246; H01M 4/242; H01M 10/4242; H01M 2300/0014; H01M 50/411; Y02E 60/10
See application file for complete search history.

(56) References Cited

U.S. PATENT DOCUMENTS

| 4,395,469 A | 7/1983 | Fritts |
| 2005/0202290 A1 | 9/2005 | Merzougui et al. |
| 2016/0285087 A1* | 9/2016 | Muraki ................. H01M 4/383 |

FOREIGN PATENT DOCUMENTS

| JP | 5251108 A | 9/1993 |
| JP | 7288137 A | 10/1995 |

(Continued)

OTHER PUBLICATIONS

Zhou Ye et al., "Oxygen and hydrogen gas recombination in NiMH cells," Journal of Power Sources, vol. 208, Feb. 12, 2012, p. 232-236, XP055594028, CH, ISSN: 0378-7753, DOI: 10.1016/j.jpowsour.2012.02.028.

*Primary Examiner* — Cynthia H Kelly
*Assistant Examiner* — Monique M Wills
(74) *Attorney, Agent, or Firm* — Capitol City TechLaw (57) ABSTRACT

The invention relates to a starved metal hydride battery. The battery is characterized in that the battery further comprises adding of oxygen gas or hydrogen gas or hydrogen peroxide or a combination thereof in order to rebalance the electrodes and replenish the electrolyte by reactions with the electrode materials.

20 Claims, 4 Drawing Sheets

(51) Int. Cl.
*H01M 10/24* (2006.01)
*H01M 10/34* (2006.01)
*H01M 50/30* (2021.01)
*H01M 50/60* (2021.01)
*H01M 50/411* (2021.01)

(56) References Cited

FOREIGN PATENT DOCUMENTS

| | | |
|---|---|---|
| JP | 837022 A | 2/1996 |
| JP | 3182193 B2 | 7/2001 |
| JP | 2003178738 A | 6/2003 |
| JP | 2010-15729 A | 1/2010 |
| WO | 03026042 A1 | 3/2003 |

* cited by examiner

METAL HYDRIDE BATTERY WITH ADDED HYDROGEN GAS, OXYGEN GAS OR HYDROGEN PEROXIDE

This application is a continuation application of U.S. patent application Ser. No. 15/769,015 filed Apr. 17, 2018, which is a US National Phase Application of International Application No. PCT/SE2016/051020 filed Oct. 19, 2016, which claims priority under 35 USC 119(a)-(d) to SE Patent Application No. 1551360-9 filed Oct. 21, 2015, the entire content of all three of which are incorporated herein by reference.

FIELD

The present invention relates generally to the field of starved metal hydride batteries. The device comprises a metal hydride battery where hydrogen or oxygen gas or hydrogen peroxide is added to improve performance. Further, the present invention relates specifically to the field of increasing the lifetime of the battery.

BACKGROUND

Figure 1:
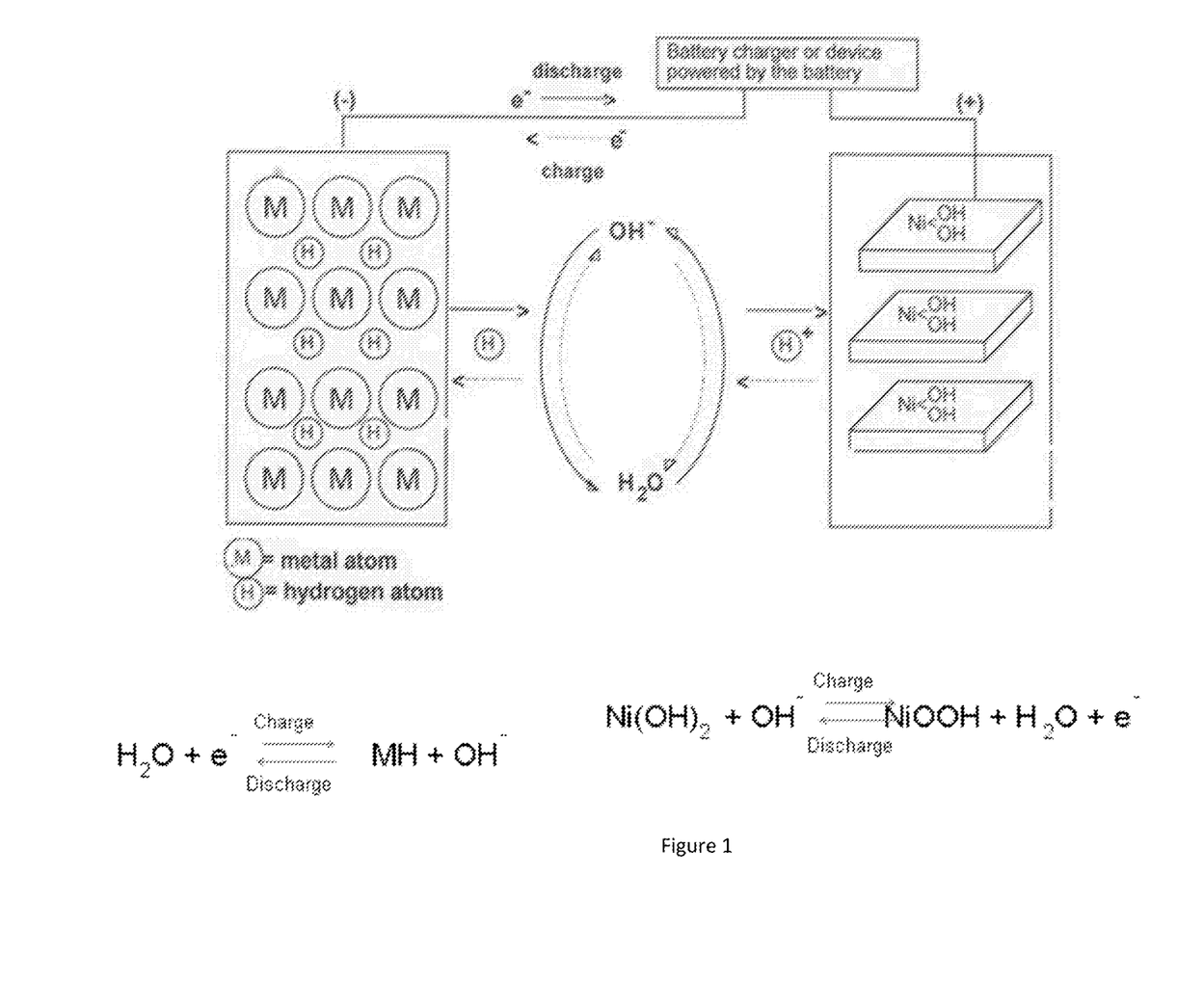
FIG. 1 is a schematic figure of a metal hydride battery.

Nickel metal hydride (NiMH) batteries have long cycle life and have rapid charge and discharge capabilities. During charge and discharge the electrodes interact with each other through the alkaline electrolyte as hydrogen is transported in the form of water molecules between the electrodes. During discharge hydrogen is released from the negative electrode and is allowed to migrate to the positive electrode (nickel electrode) where it intercalates. This binding results in energy being released. During charging the hydrogen migration is reversed, see FIG. 1.

Especially NiMH batteries are designed to be nickel electrode limited with a starved electrolyte. This is done in order to be able to avoid overcharge and overdischarge states of the battery cells by controlling the cell chemistry and state-of-charge via the gas phase.

When the cell is charged, hydrogen is transported from the nickel hydroxide to the metal hydride by water molecules in the aqueous alkaline electrolyte. During discharge hydrogen is transported back to the nickel hydroxide electrode, again in the form of water molecules.

If the cell is charged beyond the capacity of the nickel electrode, hydrogen will still be transported and intercalated into the metal hydride electrode by water molecules, but in this case hydrogen will be taken from the aqueous electrolyte resulting in a production of oxygen gas. The overcharging reaction is thus denoted: $4OH_-=2H_2O_2+4e^- (E^0=+0.401V)$. A cell with a starved electrolyte means in contrast to a flooded cell, that the amount of electrolyte is so limited that open spaces and channels exists between the electrodes through the separator. These open channels can now transport the oxygen to the metal hydride electrodes, where it can be recombined to form water. This recombination reaction is denoted: $2MH+O_2=2H_2O+2M$. The metal hydride electrode has thus a certain overcharge capacity reserve in relation to the nickel electrode.

If the cell on the other hand is overdischarged, hydrogen will be transported to the nickel electrode. But as the capacity of the nickel electrode is below that of the metal hydride electrode, hydrogen will be released as hydrogen gas molecules instead of being intercalated into the nickel hydroxide. These hydrogen gas molecules can also migrate through the open channels to the metal hydride electrode and be recombined into water. A certain overdischarge capacity of the metal hydride electrode is usually created by adding cobalt to the nickel electrode, which results in a controlled pre-charging of the metal hydride electrode during the formation of the battery cells.

Figure 2:
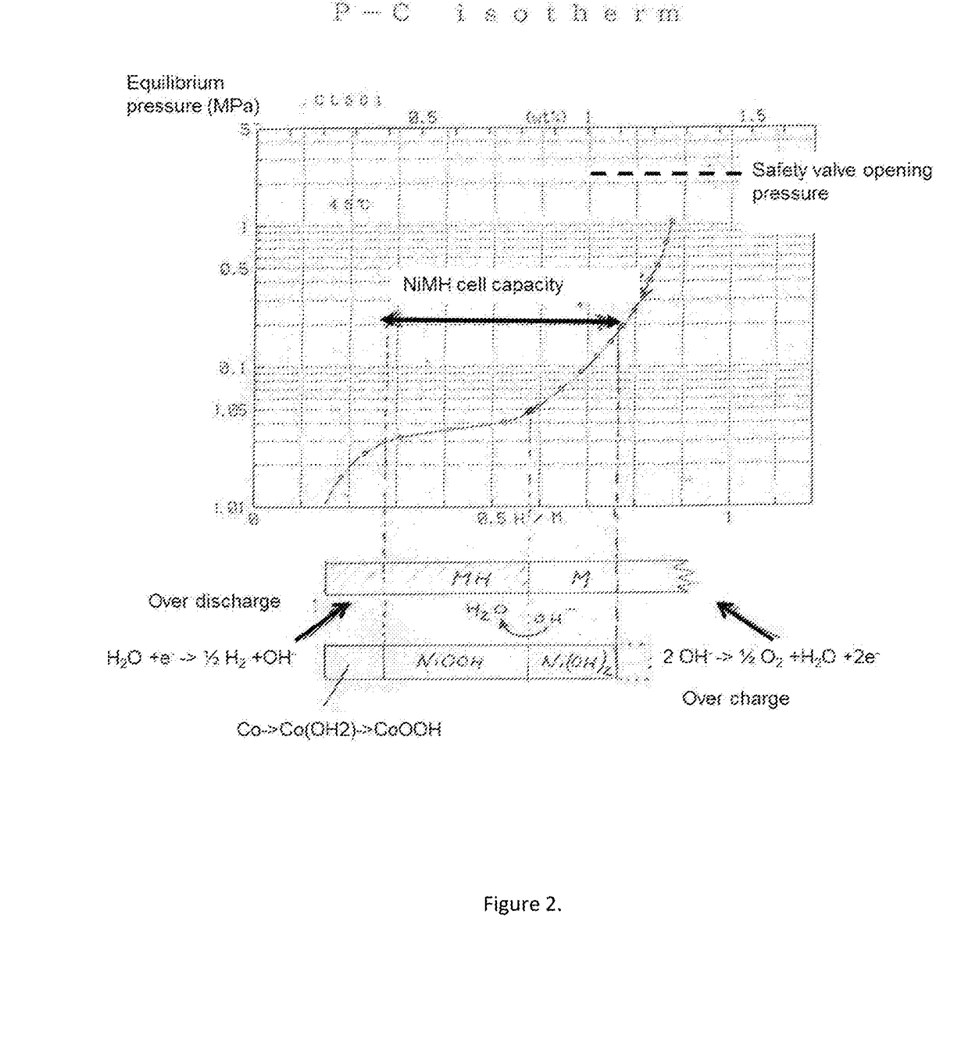
FIG. 2 is a graph disclosing how the electrode capacities are related to the hydrogen equilibrium pressure of the metal hydride used in the negative electrode.

A proper balance of the nickel electrode capacity with respect to the metal hydride electrode capacity with suitable amounts of both overcharge- and overdischarge reserves are essential for a well-functioning battery, enabling it to reach a stable long time charge/discharge performance, FIG. 2.

This essential balancing of the two electrodes' capacity with respect to each other is unfortunately impaired by several mechanisms as the battery cells age.

OBJECTS OF NON-LIMITING EMBODIMENTS

Non-limiting embodiments aim at obviating the aforementioned disadvantages and failings of previously known prior art, and at providing an improved battery. But it can also be used to control the balancing of the electrodes without the use of cobalt addition, thus reducing material cost.

A first aspect of the present invention is to provide an improved battery of the initially defined type claim 1. A second aspect of the present invention is to provide a battery which comprises cobalt hydroxide. In such a battery the precharge created by the cobalt hydroxide in the nickel electrode can be adjusted. In third aspect the present invention relates to a method of preparing the battery according to the present invention. In a fourth aspect the present invention relates to a method of counteracting the negative effects of corrosion in a metal hydride battery. In a fifth aspect the present invention relates to a method of replenishing an alkaline electrolyte in a metal hydride battery. In a sixth aspect the present invention relates to a method of rebalancing the electrodes in a metal hydride battery.

SUMMARY

According to the invention at least the primary aspect is attained by means of the initially defined battery and method of preparing the battery having the features defined in the independent claims. Preferred embodiments of the present invention are further defined in the dependent claims.

According to a first aspect of the present invention, there is provided a starved battery of the initially defined type, which is characterized in that the housing of the battery contains added oxygen gas, hydrogen gas or hydrogen peroxide.

The battery has a housing containing at least one cell wherein said at least one cell comprises a first electrode, a second electrode, a porous separator arranged between the first electrode and the second electrode, and an aqueous alkaline electrolyte arranged between the first electrode and the second electrode. When it is stated that the aqueous alkaline electrolyte is arranged between the first electrode and the second electrode, it is meant that the electrolyte is in contact with the first and second electrodes. The separator, the first electrode and the second electrode are configured to allow exchange of hydrogen and oxygen by allowing gas to migrate between the two electrodes. The housing further comprises means for adding a gas or a liquid to the housing. The battery further comprises added oxygen gas or hydrogen gas or hydrogen peroxide or a combination thereof in order to rebalance the electrodes and replenish the electrolyte by reactions with the electrode materials.

According to a second aspect of the present invention, there is provided a starved battery according to claim 17.

Such a starved battery has a housing containing at least one cell wherein the said at least one cell comprises a first electrode, a second electrode, and an aqueous alkaline electrolyte arranged between the first electrode and the second electrode. The first electrode is a metal hydride electrode (MH) and the second electrode is a nickel hydroxide electrode ($Ni(OH)_2$/NiOOH) further comprising cobalt hydroxide ($Co(OH)_2$/CoOOH). The housing further comprises means for adding a gas or a liquid to the housing, and the battery further comprises added hydrogen peroxide.

Thus, the present invention is based on the insight of that adding oxygen gas, hydrogen gas or hydrogen peroxide provides a suitable overcharge and discharge reserve and replenishes the electrolyte, which prolongs the lifetime of the battery and increases the number of possible cycles. Without being bound by any theory this may be due to that the addition of gas or the addition of oxygen in the peroxide restores the electrode balance resulting in that the internal gas pressure decreases since the gas recombination is improved. Thus the battery becomes less sensitive to unintentional overcharging and over discharging.

Further features applicable to the battery according to the first and/or second aspects are outlined below.

In a preferred embodiment of the present invention, the battery comprises nickel hydroxide electrode ($Ni(OH)_2$/NiOOH).

For example, the first electrode may be a metal hydride electrode (MH) and the second electrode may be a nickel hydroxide electrode ($Ni(OH)_2$/NiOOH). The first electrode may be a cadmium electrode (Cd) and the second electrode may be a nickel hydroxide electrode ($Ni(OH)_2$/NiOOH). The first electrode may be a zinc electrode (Zn) and the second electrode may be a nickel hydroxide electrode ($Ni(OH)_2$/NiOOH).

The battery may comprise one or more cells, such as two or more cells, and may further comprise a common gas space for all of the two or more cells.

The amount of added oxygen or hydrogen may be up to 2 moles per mole of active metal hydroxide, such as $Ni(OH)_2$/Ni(OOH), content in the battery.

The hydrogen peroxide addition may be up to 2 moles per mole of active metal hydride content in the battery.

The first electrode may be a metal hydride electrode (MH) and the second electrode may be a nickel hydroxide electrode ($Ni(OH)_2$/NiOOH) further comprising cobalt hydroxide ($Co(OH)_2$/CoOOH).

The second electrode may optionally further comprise zinc hydroxide ($Zn(OH)_2$).

The first electrode may be a metal hydride electrode (MH) and the second electrode may be a nickel hydroxide electrode ($Ni(OH)_2$/NiOOH) further comprising zinc hydroxide ($Zn(OH)_2$). The second electrode may optionally further comprise cobalt hydroxide ($Co(OH)_2$/CoOOH).

The aqueous alkaline electrolyte may comprise a mixture of lithium-, sodium- and potassium hydroxide (LiOH, NaOH, KOH). The first or the second electrode may further comprise one or more of Cerium (Ce), Lanthanum (La), Praseodymium (Pr), Manganese (Mn), Niobium (Nb), Cobalt (Co), Nickel (Ni), Magnesium (Mg), Neodymium (Nd), Titanium (Ti), Zirconium (Zr) Vanadium (V), Chromium (Cr), Tin (Sn), Yttrium (Y) or Aluminium (Al), such as one or more of Cerium (Ce), Lanthanum (La), Praseodymium (Pr), Manganese (Mn), Niobium (Nb), Nickel (Ni), Magnesium (Mg), Neodymium (Nd), Titanium (Ti), Zirconium (Zr), Vanadium (V), Chromium (Cr), Tin (Sn), or Aluminium (Al). Preferably the first electrode may comprise one of more of these elements.

The added hydrogen gas, oxygen gas or hydrogen peroxide may be added separately, or consecutively, or in a mixture of hydrogen gas and oxygen gas, or oxygen gas and hydrogen peroxide, or hydrogen gas and hydrogen peroxide.

The porous separator may be made of a polyamide or a polyolefin such as polypropylene.

The second electrode may be a nickel hydroxide electrode ($Ni(OH)_2$/NiOOH). This nickel hydroxide electrode ($Ni(OH)_2$/NiOOH) may optionally further comprise cobalt hydroxide ($Co(OH)_2$/CoOOH) and/or zinc hydroxide ($Zn(OH)_2$).

The housing may comprise a means for reducing the pressure in the housing. The means for adding a gas or a liquid to the housing and the means for reducing the pressure in the housing may be the same.

The housing may comprise a safety vent arranged to limit the maximum internal pressure prevailing in the housing.

The housing may comprise a single housing, or the housing may comprise two or more sub-housings, wherein each sub-housing is in gaseous communication with at least one other sub-housing by means of a gas conduit.

According to another aspect of the present invention, the objects of the invention are achieved by a method of preparing the battery described above, as disclosed in the appended claims. The method of preparing the battery comprising the steps:

a. providing a housing, a first electrode, a second electrode, and an aqueous alkaline electrolyte, wherein the housing comprises a means for reducing the pressure in the housing and means for adding a gas or a liquid to the housing;

b. arranging the first electrode and the second electrode and the alkaline electrolyte in the housing in order to prepare a starved battery;

c. evacuating the housing using said means for reducing the pressure in the housing in order to create a reduced pressure; and d. adding oxygen gas, hydrogen gas or hydrogen peroxide to the housing using said means for adding a gas or a liquid to the housing. The steps c and d may be repeated at least once, preferably twice.

According to a further aspect, the objects of the invention are achieved by a method of counteracting the negative effects of corrosion of a metal hydride electrode in a battery, according to the appended claims. The battery has a housing containing at least one cell wherein the said at least one cell comprises a first electrode, a second electrode, and an aqueous alkaline electrolyte arranged between the first and the second electrode, wherein the first electrode is a metal hydride electrode (MH) and the second electrode is a nickel hydroxide electrode ($Ni(OH)_2$/NiOOH), and wherein the housing further comprises means for adding a gas or a liquid to the housing. The method comprises adding oxygen gas or hydrogen gas or hydrogen peroxide or a combination thereof to the battery at any state of charge (SOC).

According to yet another aspect, the objects of the invention are achieved by a method of replenishing an aqueous alkaline electrolyte in a battery, as disclosed in the appended claims. The battery has a housing containing at least one cell wherein the said at least one cell comprises a first electrode, a second electrode, and the aqueous alkaline electrolyte arranged between the first electrode and the second electrode, wherein the first electrode is a metal hydride electrode (MH) and the second electrode is a nickel hydroxide electrode ($Ni(OH)_2$/NiOOH), and wherein the housing further comprises means for adding a gas or a liquid to the housing. The method comprises adding oxygen gas or hydrogen gas or hydrogen peroxide or a combination thereof to the battery in order to create water by the recombination reactions of the respective gases with the active electrode materials in the battery.

The oxygen gas or hydrogen gas or hydrogen peroxide or a combination thereof may be added to the battery before the battery has reached not less than 50% of state of charge (SOC) or not less than 20% of state of charge (SOC).

According to yet a further aspect, the objects of the invention are achieved by a method of re-establishing the balance between a first electrode and a second electrode in a battery, as disclosed in the appended claims. The battery has a housing containing at least one cell wherein the said at least one cell comprises the first electrode, the second electrode, and an aqueous alkaline electrolyte arranged between the first electrode and the second electrode, wherein the first electrode is a metal hydride electrode (MH) and the second electrode is a nickel hydroxide electrode ($Ni(OH)_2$/NiOOH), and wherein the housing further comprises means for adding a gas or a liquid to the housing. The method comprises adding oxygen gas or hydrogen gas or hydrogen peroxide or a combination thereof to the battery.

Further advantages with and features of the invention will be apparent from the other dependent claims as well as from the following detailed description of preferred embodiments.

All the embodiments of the present application are applicable to all of the aspects of the present invention.

BRIEF DESCRIPTION OF THE DRAWINGS

A more complete understanding of the abovementioned and other features and advantages of the present invention will be apparent from the following detailed description of preferred embodiments in conjunction with the appended drawings, wherein.

DESCRIPTION OF NON-LIMITING EMBODIMENTS

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and the equivalents thereof. Thus, the equipment may be modified in all kinds of ways within the scope of the appended claims.

It shall also be pointed out that all information about/concerning terms such as above, under, upper, lower, etc., shall be interpreted/read having the equipment oriented according to the figures, having the drawings oriented such that the references can be properly read. Thus, such terms only indicates mutual relations in the shown embodiments, which relations may be changed if the inventive equipment is provided with another structure/design.

It shall also be pointed out that even thus it is not explicitly stated that features from a specific embodiment may be combined with features from another embodiment, the combination shall be considered obvious, if the combination is possible.

Throughout this specification and the claims which follows, unless the context requires otherwise, the word "comprise", and variations such as "comprises" or "comprising", will be understood to imply the inclusion of a stated integer or steps or group of integers or steps but not the exclusion of any other integer or step or group of integers or steps.

Figure 3:
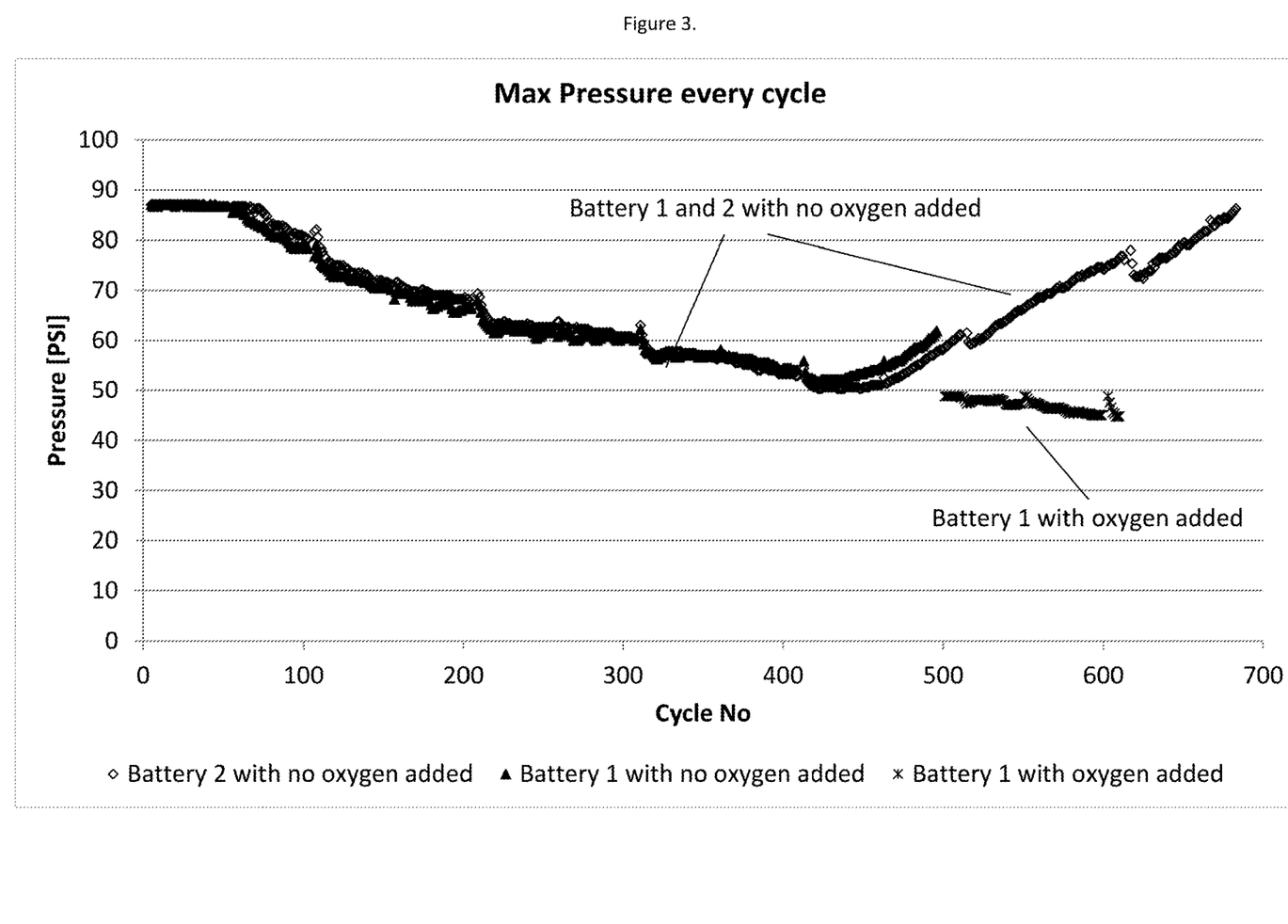
FIG. 3 is a graph disclosing maximum pressure at every cycle.
Figure 4:
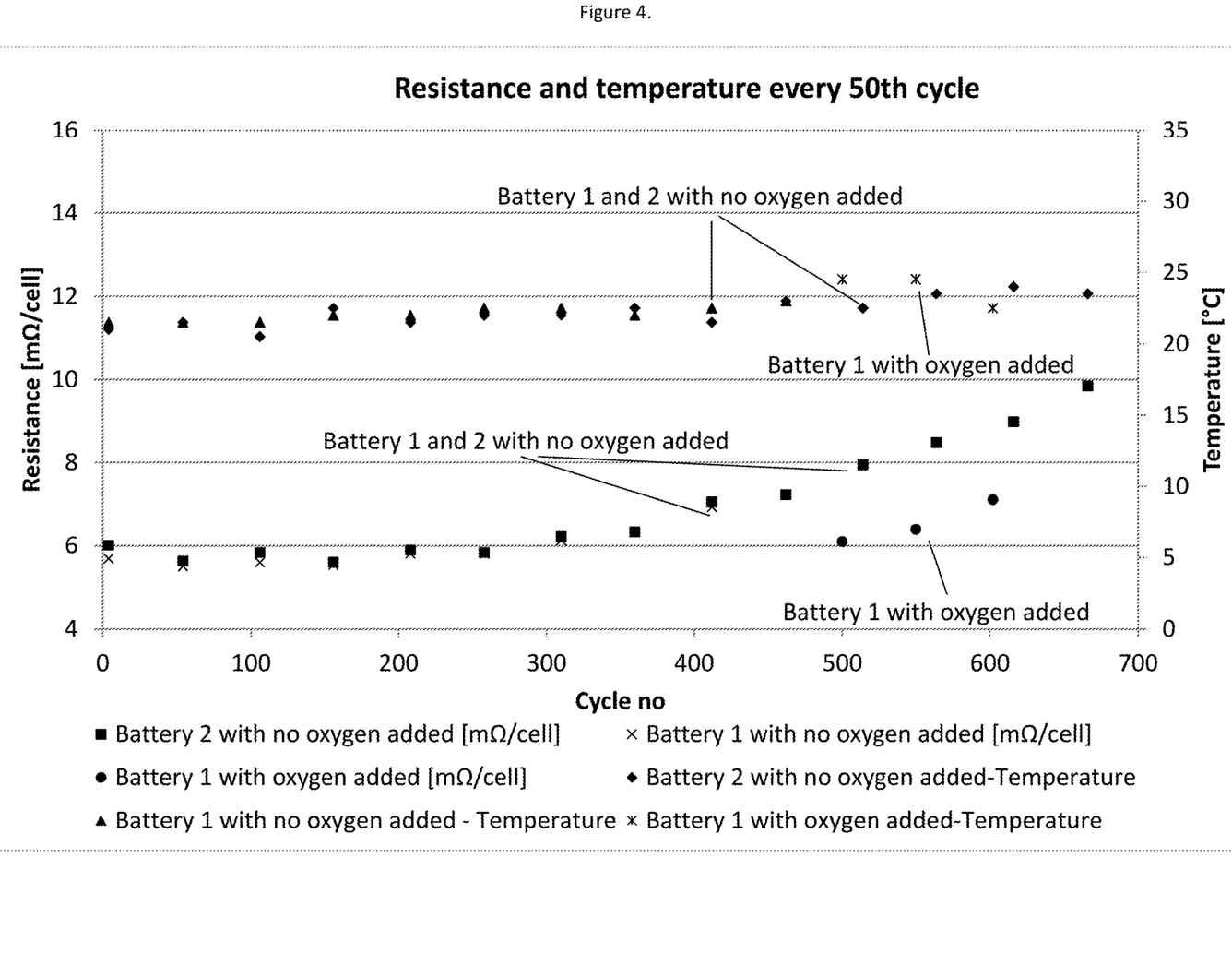
FIG. 4 is a graph disclosing the resistance at every 50 cycles.

The present invention aims at providing a battery that rebalances, replenishes and counteracts the detrimental effect of corrosion and this be accomplished by adding oxygen, hydrogen and/or hydrogen peroxide to the cell. The oxygen, hydrogen or hydrogen peroxide may be added separately or consecutively. The starved electrolyte design means that only a minimal amount of electrolyte is available in the battery. Any loss of electrolyte will impair performance mainly manifested in an increased internal resistance. Electrolyte dry-out is the main cause for limiting the cycle life. The electrolyte dry-out is mainly caused by either excessive internal cell pressure, which may open the safety valve releasing either oxygen or hydrogen gas dependent upon abusive overcharge or overdischarge, FIGS. 1 to 4. Electrolyte dry-out is also a result of absorption of electrolyte into the nickel hydroxide structure or by corrosion of the metal hydride alloy. The latter is especially detrimental as the corrosion produces hydrogen, which offsets the capacity balance between the nickel- and the metal hydride electrodes. This results in an increased overdischarge reserve, but also a reduced overcharge capacity leading to an excessive internal gas pressure buildup. This increases the risk of venting the battery cells and accelerating the dry-out. The effect is aggravated by the shift of the metal hydride working point to higher equilibrium hydrogen pressures. This increases the hydrogen partial pressure, which in turn reduces the efficiency of the oxygen recombination reaction. Adding oxygen gas to the cell will prohibit this development in two ways 1) Oxygen will restore the balance between the electrodes by oxidizing the hydrogen produced in the corrosion described above into water. This will result in a reduced pressure build up during overcharge. (FIG. 3)
2) The water produced in (1) will replenish the amount of electrolyte and reduce internal resistance. (FIG. 4)

Adding water only to the battery cells will reduce the internal resistance but not the pressure build-up as the electrode imbalance remains. Adding peroxide $H_2O_2$ would on the other hand replenish the electrolyte as well as reestablishing the electrode balance. Adding consecutively hydrogen gas and oxygen gas can add a controlled volume of water to the electrolyte as well as it is a method to control the balance between electrodes. The latter can thus be another way to adjust the electrode balance without using a cobalt addition to the nickel electrode as described above.

A battery according to the present invention is starved having a housing containing at least one cell. Each cell comprises at least two electrodes, a first and a second electrode, and a porous separator. An aqueous alkaline electrolyte and a porous separator are arranged between the first and the second electrode. The starved configuration allows exchange of hydrogen and oxygen via the electrolyte and the separator allowing gas to migrate between the two electrodes. The housing further comprises means for adding a gas or a liquid to the housing and the battery further comprises added oxygen gas or hydrogen gas or hydrogen peroxide or a combination thereof. These are added in order to rebalance the electrodes and replenish the electrolyte by reactions with the electrode materials. The addition of oxygen, hydrogen or hydrogen peroxide may also avoid or minimize the negative effects of corrosion. The oxygen or hydrogen or hydrogen peroxide addition in the battery can be made at any state of charge (SOC). But preferably hydrogen is added at a low SOC and oxygen and hydrogen peroxide at a high SOC to facilitate their uptake and consecutively their transformation into water, which is replenishing the electrolyte.

A battery according to the present invention is starved having a housing containing at least one cell. The housing may consist of a single discrete structure housing all of the cells of the battery, or may comprise several sub-housings, each sub-housing housing a fraction of the total number of the cells of the battery. The battery may be of any construction, including those known in the art, such as cylindrical, prismatic or bi-polar.

Each cell comprises at least two electrodes, a first and a second electrode, and a porous separator. An aqueous alkaline electrolyte and a porous separator are arranged between the first and the second electrode. The first electrode is a metal hydride electrode (MH) and the second electrode is a nickel hydroxide electrode ($Ni(OH)_2$/NiOOH) further comprising cobalt hydroxide ($Co(OH)_2$/CoOOH). The housing further comprises means for adding a gas or a liquid to the housing.

The battery may comprise only one cell but the number of cells may be two or more, or three or more, or four or more. When the number of cells is two or more the battery may comprise a common gas space for all or for some of the cells. If the housing comprises several sub-housings, the common gas space may be achieved by providing a gas conduit connecting each sub-housing to at least one other sub-housing. In this manner, a modular battery assembly may be achieved.

For example, bi-polar batteries having a common gas space are disclosed in document WO 03/026042 "A bipolar battery and biplate assembly".

Each cell comprises at least two electrodes but it may comprise four or more, or six or more electrodes. The electrodes are metal hydrides (MH) or metal hydroxide (MOH). The first electrode is a metal or metal alloy and may be a metal hydride electrode (MH). The second electrode may be a nickel hydroxide electrode ($Ni(OH)_2$/Ni(OOH)). In one embodiment the first electrode is a cadmium electrode (Cd) and the second electrode is a nickel hydroxide electrode ($Ni(OH)_2$/NiOOH). In another embodiment the first electrode is a zinc electrode (Zn) and the second electrode is a nickel hydroxide electrode ($Ni(0H_2$/NiOOH). In one embodiment the first or the second electrodes comprises one or more of Cerium (Ce), Lanthanum (La), Praseodymium (Pr), Neodynium (Nd), Titanium (Ti), Zirconium (Zr), Vanadium (V), Chromium (Cr), Tin (Sn), Manganese (Mn), Niobium (Nb), Cobalt (Co), Nickel (Ni), Magnesium (Mg), Yttrium (Y) or Aluminium (Al). Preferably the first electrode contains one or more of these elements. For example, the first electrode may be of a hydrogen storage alloy known for use in NiMH batteries, such as $AB_5$ alloys or $A_2$ alloys. In one embodiment the second electrode further comprises cobalt or cobalt hydroxide ($Co(OH)_2$/CoOOH). The amount of cobalt or cobalt hydroxide may be 0 to 15 mol % such as 1 to 10 mol % or 2 to 5 mol % of the content of the electrode. In one embodiment the second electrode further comprises zinc or zinc hydroxide ($Zn(OH)_2$/CoOOH). The amount of zinc or zinc hydroxide may be 0 to 10 mol %, such as 2 to 5 mol % of the content of the electrode. The second electrode may further comprise both cobalt hydroxide and zinc hydroxide in the proportions given above. However, the second electrode may also be essentially cobalt-free or cobalt-free.

The porous separator may be made of any suitable material for example the separator may be made of a plastic material such as a polyolefin (polyethylene, polypropylene for example) or a polyamide or a natural polymer such as cotton, nylon or polyesters such as poly(ethylene terephthalate) or polytetrafluoroethylene or polyvinyl chloride, or a combination thereof. The polymeric separator may be a non-woven material. The pores may have a size of 10-1000 nm such as 20-500 nm, such as 30 to 100 nm.

The electrolyte is an aqueous alkaline electrolyte which may comprise, besides water, alkali or alkali earth metal hydroxides. In one embodiment the electrolyte comprises potassium hydroxide. In another embodiment the electrolyte comprises lithium hydroxide. In yet another embodiment the electrolyte comprises sodium hydroxide. In one embodiment the electrolyte comprises lithium, sodium and/or potassium hydroxide (LiOH, NaOH, KOH).

The means for adding gas (or removing gas, evacuating the housing) or liquid may be any suitable means such as a regulator, valve or check valve.

In order to overcome the drawbacks of the prior art the battery according to the present invention comprises adding of oxygen gas, hydrogen gas or hydrogen peroxide. In one embodiment the added hydrogen gas, oxygen gas or hydrogen peroxide is in a mixture of hydrogen gas and oxygen gas, or oxygen gas and hydrogen peroxide, or hydrogen gas and hydrogen peroxide. The addition may be repeated one or more times. The amounts mentioned below refer to amounts added each time or the total added amount during the whole life cycle of the battery. The amount of added oxygen or hydrogen is up to 2 moles per mole of active metal hydroxide, such as $Ni(OH)_2$/NiOOH, content in the battery, preferably not less than 0.001 moles per mole active metal hydroxide. The amount of added oxygen or hydrogen may be up to 1.5 moles per mole active metal hydride, or up to 3 moles. When the electrode comprises cobalt hydroxide the amount of added oxygen may be 0.1 to 2 moles per active cobalt hydroxide, such as 0.5 to 1.5 moles per active cobalt hydroxide. In one embodiment the amount of added oxygen or hydrogen gas is 0.05 to 2 moles per mole active metal hydroxide, such as 1 to 1.5 moles. The amount of added hydrogen peroxide may be 1 moles per mole active metal hydride. Hydrogen peroxide is believed to re-establish the balance of both electrodes similar to the addition of oxygen gas.

The battery according to the present invention may be prepared by providing a housing, at least two electrodes, a porous separator and an aqueous alkaline electrolyte and arranging the two electrodes in the housing together with the electrolyte and the separator. The housing comprises means for adding or removing gas or liquid and the housing is evacuated using said means in order to create a reduced pressure. To the housing oxygen gas, hydrogen gas or hydrogen peroxide is then added using said means. The step of evacuating the housing and adding oxygen gas, hydrogen gas or hydrogen peroxide may be repeated in order to obtain a more controlled environment inside the housing.

By adding oxygen gas, hydrogen gas or hydrogen peroxide to the housing the negative effects of corrosion of the electrodes will be reduced.

Addition of oxygen gas or hydrogen gas or hydrogen peroxide or a combination thereof to the battery results in creation of water by the recombination reactions of the respective gases or liquids with the active electrode materials in the battery. The addition may be done at any state of charge (SOC). This will replenish the electrolyte in the starved battery.

Preferably hydrogen is added at a low SOC and oxygen and hydrogen peroxide at a high SOC to facilitate their uptake and consecutively their transformation into water to be added to the electrolyte. In one embodiment the addition of hydrogen gas may be done to the battery before the battery has reached not less than 50% of state of charge (SOC) or not less than 20% of state of charge (SOC). In one embodiment the addition of oxygen gas or hydrogen peroxide is done to the battery when the battery has reached a state of charge of at least 50%, or at least 75%. The addition of oxygen gas, hydrogen gas or hydrogen peroxide may also re-establish the balance between a first and a second electrode in the battery. Hydrogen peroxide is believed to re-establish the balance between the electrodes.

What is claimed is:

1. A battery comprising:
   a housing containing at least one cell;
   wherein the at least one cell includes a first electrode, a second electrode, a porous separator arranged between the first electrode and the second electrode, and an aqueous alkaline electrolyte arranged between the first electrode and the second electrode;
   wherein the separator, the first electrode and the second electrode are configured to allow exchange of hydrogen and oxygen by allowing gas to migrate between the two electrodes;
   wherein the housing includes means for adding a gas or a liquid to the housing;
   wherein the battery further includes from an external source added oxygen gas or hydrogen gas or hydrogen peroxide or a combination thereof configured to rebalance the electrodes and/or replenish the electrolyte; and
   wherein the first electrode is a metal hydride electrode.

2. The battery according to claim 1, wherein the first electrode is the metal hydride electrode and the second electrode is a nickel hydroxide electrode.

3. The battery according to claim 1, wherein the battery comprises two or more cells.

4. The battery according to claim 3, wherein the battery further comprises a common gas space for all of the two or more cells.

5. The battery according to claim 1, wherein the amount of added oxygen gas or hydrogen gas is up to 2 moles per mole of active metal hydroxide content in the battery.

6. The battery according to claim 1, wherein hydrogen peroxide additions are up to 2 moles per mole of active metal hydride content in the battery.

7. The battery according to claim 1, wherein the first electrode is the metal hydride electrode and the second electrode is a nickel hydroxide electrode; and
   wherein the nickel hydroxide electrode further comprises $Co(OH)_2$ and/or CoOOH.

8. The battery according to claim 1, wherein the aqueous alkaline electrolyte comprises a mixture of lithium hydroxide, sodium hydroxide, and potassium hydroxide.

9. The battery according to claim 1, wherein the first or the second electrode comprises one or more of Cerium (Ce), Lanthanum (La), Praseodymium (Pr), Manganese (Mn), Niobium (Nb), Nickel (Ni), Magnesium (Mg), Neodymium (Nd), Titanium (Ti), Zirconium (Zr) Vanadium (V), Chromium (Cr), Tin (Sn), or Aluminium (Al).

10. The battery according to claim 1, wherein the added hydrogen gas, oxygen gas or hydrogen peroxide are added separately or consecutively or in a mixture of hydrogen gas and oxygen gas, or oxygen gas and hydrogen peroxide, or hydrogen gas and hydrogen peroxide.

11. The battery according to claim 1, wherein the porous separator is made of a polyamide or a polyolefin.

12. The battery according to claim 1, wherein the second electrode is a nickel hydroxide electrode; and
    wherein the nickel hydroxide electrode further comprises $Co(OH)_2$, CoOOH, and/or $Zn(OH)_2$.

13. The battery according to claim 1, wherein the housing comprises means for reducing the pressure in the housing.

14. The battery according to claim 13, wherein the means for adding a gas or a liquid to the housing and the means for reducing the pressure in the housing are the same.

15. The battery according to claim 1, wherein the housing comprises a safety vent arranged to limit the maximum internal pressure prevailing in the housing.

16. The battery according to claim 1, wherein the housing comprises a single housing; or
    wherein the housing comprises two or more sub-housings, each sub-housing being in gaseous communication with at least one other sub-housing via a gas conduit.

17. A battery comprising:
    a housing containing at least one cell;
    wherein the at least one cell includes a first electrode, a second electrode, and an aqueous alkaline electrolyte arranged between the first electrode and the second electrode;
    wherein the first electrode is a metal hydride electrode and the second electrode is a nickel hydroxide electrode comprising $Ni(OH)_2$ or NiOOH, and further comprising $Co(OH)_2$ or CoOOH;
    wherein the housing includes means for adding a gas or a liquid to the housing; and
    wherein the battery further includes from an external source added hydrogen peroxide configured to rebalance the electrodes and/or replenish the electrolyte.

18. A method of preparing the battery according to claim 1, the method comprising:
    a. providing the housing, the first electrode, the second electrode, and the aqueous alkaline electrolyte;
    b. arranging the first electrode and the second electrode and the alkaline electrolyte in the housing to prepare a starved electrolyte battery; and
    d. adding oxygen gas, hydrogen gas or hydrogen peroxide to the housing using the means for adding a gas or a liquid to the housing.

19. The method according to claim 18, further comprising a step c. of evacuating the housing using means for reducing pressure in the housing to create a reduced pressure;
    wherein the steps c and d are repeated.

20. A method of replenishing an electrolyte and/or re-establishing the balance between a first electrode and a second electrode in a battery that has a housing containing at least one cell, wherein the at least one cell includes the first electrode, the second electrode, and an aqueous alkaline electrolyte arranged between the first electrode and the second electrode, wherein the first electrode is a metal hydride electrode and the second electrode is a nickel hydroxide electrode comprising $Ni(OH)_2$ or NiOOH, and wherein the housing includes means for adding a gas or a liquid to the housing;
    wherein the method comprises adding from an external source oxygen gas or hydrogen gas or hydrogen peroxide or a combination thereof to the battery to rebalance the electrodes and/or replenish the electrolyte.

* * * * *